UNITED STATES PATENT OFFICE.

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN.

PLASTIC COMPOSITION.

1,339,552.  Specification of Letters Patent.  Patented May 11, 1920.

No Drawing.  Application filed December 1, 1919. Serial No. 341,784.

*To all whom it may concern:*

Be it known that I, HERBERT H. DOW, a citizen of the United States, residing at Midland, in the county of Midland and State of Michigan, have invented a certain new and useful Improvement in Plastic Compositions, of which the following is a full, clear, and exact description.

This invention relates to the solution of cellulose compounds so as to permit the same to be thereafter evaporated leaving the cellulose compound in the form of a hard, dense, tough and durable film. Material of this nature is widely used in the manufacture of artificial leather, of flexible windows for automobile tops and the like, of transparent flexible films for photographic and cinematographic purposes, and many other uses. It is to this phase of the art that this invention is particularly directed, although certain features of the invention are applicable to the production of varnishes, lacquers, rust-preventive coatings, and the like, or even to the production of independent articles of manufacture. It is a well known fact that certain cellulose compounds, notably the nitrates and acetates, may be dissolved in proper media and later upon evaporation will harden into a more or less solid mass whose particular properties of rigidity, plasticity, tensile strength, and transparency will depend upon the kind of solvent employed, some solvents entering into a more or less permanent chemical combination with the cellulose, and others becoming entirely freed therefrom upon a more or less prolonged exposure.

Transparency is, of course, absolutely essential to photographic film, flexible windows, varnishes, lacquers, etc., though not particularly desirable in the case of material going into artificial leather; however, it is a fact that a transparent film is generally tougher and more durable than a non-transparent one, so that it may be said generally that transparency is a desirable condition for all purposes. However, in making solvents for cellulose nitrate and acetate, experience has shown that clear films cannot be readily produced if the boiling point of the solvent is much below 100° C. Experience also shows that in homologous series, the lowest boiling point member of the series is the best solvent and incidentally the lowest member of the series is the smallest molecule.

It seems to be a fact that no large molecule is a solvent for cellulose acetates or nitrates. The methyl compounds are universally better than the ethyl, and the ethyl better than propyl, etc. No alcohol alone is a good solvent; yet very strong methyl alcohol will dissolve some of the cellulose nitrates that are most easily dissolved, but the range of nitration is very narrow through which methyl alcohol will act as a solvent. Ethyl alcohol alone will dissolve none of the cellulose nitrates.

It has long been known that compounds like methyl or ethyl alcohol, which alone are able to dissolve cellulose compounds, only slightly or not at all, will, when mixed with certain other substances, acquire the ability of a comparatively complete solution, even though the compound with which they were mixed would not alone have the ability to dissolve the same. A long known instance of this is that ethyl alcohol and methyl ether, while separately unable to dissolve cellulose nitrate, when mixed together will dissolve it readily. Likewise ethylene dichlorid, while alone unable to dissolve cellulose compounds, will, when mixed with methyl or ethyl alcohol become a solvent, although butyl, amyl, and higher alcohols are not solvents even in connection with ethylene dichlorid.

However, for the production of photographic films and in many other instances, it is not only necessary that the cellulose compound should dissolve freely and uniformly in the solvent, but that when evaporated it should be obtained as a clear, perfectly transparent, and homogeneous sheet, and this transparency and homogeneity is impossible of attainment with such readily vaporizable solvents as methyl alcohol, ethyl alcohol, methyl ether, or ethylene dichlorid, or any combinations of these; so that films made by dissolving cellulose compounds in these substances and reclaiming the same are always of a milky opaqueness which renders them totally useless for such purposes.

My researches have shown that in order to obtain a film which shall be uniform, clear and transparent, it is necessary to employ a solvent of high boiling point, possibly because the consequent slower evaporation of the solvent causes the cellulose material to congeal more slowly and so assume such a molecular condition as shall lead to the transparent condition desired. Heretofore the method of getting high boiling point solvents has been based on the use of substances of larger and more complex molecular formation, which generally tended to make the solvent property less, and if the solvent power was to be reinforced the same has heretofore been effected by adding some proportion of some smaller molecule substance lower down in the methane series.

I have conceived that by choosing the right mixture of substances, a solvent can be obtained which shall possess the requisite large molecule, ready solutive power, and high boiling point, whereby a clear and uniform film may readily be obtained and without the extreme care necessary with less perfect solvents. Also it is desirable that the different constituents of these mixtures should have substantially the same boiling point, since a mixture of two or more substances whose individual boiling points are widely different can never retain the same composition during evaporation, as the more volatile constituent will escape more rapidly and will frequently drain the mixture to such an extent that the remaining liquid no longer has solvent powers, whereupon some of the cellulose compound is precipitated and an opaque film is the result. For this reason it appears desirable that the boiling points of the constituent liquids should not vary more than fifteen to twenty degrees centigrade, otherwise an excess of low boiling point compound will be required.

It is possible to increase the boiling point of any member of homologous series by substituting halogens for hydrogen or hydroxyl units, thus retaining the solutive power of the small molecule while obtaining a slower rate of evaporation. However, these halogen compounds are not solvents alone but seem to require the admixture of a hydroxyl compound from the same series. In order to maintain the desired correspondence between the boiling points I have conceived the idea that the hydroxyl compound should be from a higher member of the series than the halogen compound. Thus if the hydroxyl compound be represented by the formula $C_n(H)_{2n+1}(OH)$, the halogen compound to be used therewith will be represented by $C_{n-1}H_{2(n-1)}Cl_2$, $C_{n-1}H_{2(n-1)}Br_2$, or $C_{n-1}H_{2(n-1)}BrCl$, which may be expressed by the statement that the hydroxyl compound is of the $C_nH_{2n+2}$ order of homologous hydrocarbon series and that the halogen compound is of the $C_{n-1}H_{2n}$ order of the same series.

In line with this conception I have discovered that by using either ethylene dibromid or ethylene chlorbromid in conjunction with propyl alcohol it is possible to dissolve readily such compounds of cellulose as the nitrates and acetates and to obtain upon evaporization of the solution a perfectly clear, uniform, and transparent film. The addition of a small amount of benzyl acetate seems to improve the film, but low boiling point compounds such as ethyl alcohol should be used only with great care and only in such proportions and mixtures as shall not result in a precipitation of the cellulose compound even though the same should disappear quite completely from the solution.

The boiling point of propyl alcohol ($CH_3$—$CH_2$—$CH_2OH$) is about 97.4° C.; that of ethylene dibromid ($CH_2$—$Br$—$CH_2Br$) is 131.6° C; and that of ethylene chlorbromid ($CH_2Br$—$CH_2Cl$) is about 107° C. Accordingly I prefer to employ as a solvent a mixture of about fifty-five parts propyl alcohol and about forty-five parts ethylene chlorbromid, together with about five parts benzyl acetate. The boiling points of propyl alcohol and ethylene chlorbromid are so close together that very little change in the composition of the solvent is observable during evaporation. However, I conceive it important always to use a sufficient excess of the low-boiling point compound so that upon evaporation there would be no time when the excess of high-boiling point compound that remains will be sufficient to precipitate the cellulose material. When these precautions are observed, it is possible to evaporate the solvent to the open air, dispensing with the cumbersome and expensive hoods and evaporation-retarders heretofore frequently used.

In the case of a compound solvent both of whose ingredients were good solvents in the presence of only a small portion of the other ingredient, a wide difference in the boiling points would be permissible. But in the case of ingredients of large and complicated molecular formation which generally have very poor solutive power it is highly important to choose those whose boiling points are reasonably near together.

In case it be desired to use ethylene dibromid instead of ethylene chlorbromid in the solvent, I prefer to increase the proportion of propyl alcohol nearly to the upper limit of solutive possibility and also increase the amount of benzyl acetate. The excess of propyl alcohol at the start renders it less likely that the more rapid evaporation of the same should cause the mixture to become unbalanced.

Benzyl acetate:

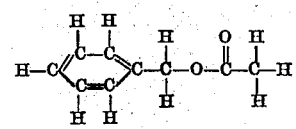

is a liquid having a boiling point of about

207° C. and is an excellent solvent in itself for both cellulose nitrate and cellulose acetate, and clear films can be made with this material without the admixture of any other solvent. The objections to this material are two in number, namely, its high price, and the fact that its boiling point is so high that the film is very slow in drying. However, as its solvent property is so good it can be mixed with other solvents that might of themselves precipitate the cellulose compound but would not do so in the presence of even a small amount of benzyl acetate. This substance, therefore, reduces the likelihood of obtaining a cloudy film by reason of the solvent mixture becoming unbalanced during evaporation, and, in addition, it evaporates more readily in connection with the more volatile substances of the mixture, so that the production of the film is not unduly delayed.

One of the greatest advantages of employing as solvents the halogen compounds hereinbefore mentioned is the fact that they are not only incombustible but are even inhibitors of combustion which is an extremely desirable property when associated with such combustible or even explosive material as cellulose nitrate. All these halogen compounds have very marked properties in reducing combustibility the bromids being better than the chlorids in this respect.

It is within my invention to utilize this compound solvent in connection with other solvents or diluents which may be used to modify the volatility of the solution, or with such compounds as shall produce a harder and more rigid substance, or with coloring matters, or with inert material to give body to the composition; also it will be obvious that the conditions of drying, as to temperature, partial pressure of the surrounding gases, etc., may be varied as desirable to achieve the particular end in view. Also it will be understood that I do not limit myself to the specific proportions above suggested nor even to the specific chemical constitution of the materials excepting as hereinafter fully set forth in the claims.

Having thus described my invention, what I claim is:—

1. A composition of matter containing cellulose nitrate, a hydroxyl compound of the $C_n$ order of the aliphatic homologous hydrocarbon series, and a halogen compound of the $C_{(n-1)}$ order of the same series, wherein $n$ represents any number from 3 to 5 inclusive.

2. A composition of matter comprising a cellulose compound dissolved in a mixture of propyl alcohol and an ethylene bromid compound.

3. A composition of matter comprising a cellulose compound dissolved in a mixture of propyl alcohol and ethlyene chlorbromid.

4. A composition of matter consisting of a cellulose compound dissolved in a mixture of propyl alcohol and an ethylene halogen compound, in admixture with other solvents and inert substances.

5. A composition of matter consisting of a cellulose compound dissolved in a mixture of propyl alcohol, an ethylene halogen compound, and benzyl acetate.

6. A composition of matter consisting of a cellulose compound dissolved in a mixture of substances of the aliphatic homologous hydrocarbon series, one of said substances being a hydroxyl compound of the $C_n$ order and another being a halogen compound of the $C_{(n-1)}$ order, wherein $n$ equals any whole number from 3 to 5 inclusive, together with an additional hydrocarbon compound which is miscible with such solution in all proportions and has a high boiling point and independent solutive power.

7. A composition of matter containing a cellulose compound, propyl alcohol, ethylene chlorbromid, and benzyl acetate.

8. A composition of matter containing a cellulose compound, a liquid monohydrodxy aliphatic alcohol having more than two carbon atoms, and a halogenated derivative of ethylene.

9. A composition of matter containing a cellulose compound, a liquid monohydroxy aliphatic alcohol having more than two carbon atoms and an ethylene bromid compound.

10. A composition of matter containing a cellulose compound, a liquid monohydroxy aliphatic alcohol having more than two carbon atoms, and ethylene chlorbromid.

11. A composition of matter containing a cellulose compound and an ethylene bromid compound.

12. A composition of matter containing a cellulose compound and ethylene chlorbromid.

13. A composition of matter containing cellulose nitrate and an ethylene bromid compound.

14. A composition of matter containing cellulose nitrate and ethylene chlorbromid.

In testimony whereof, I hereunto affix my signature.

HERBERT H. DOW.